US011544394B2

(12) United States Patent
Lawrenson et al.

(10) Patent No.: US 11,544,394 B2
(45) Date of Patent: Jan. 3, 2023

(54) INFORMATION PROCESSING APPARATUS AND METHOD FOR PROCESSING INFORMATION

(71) Applicant: Sony Corporation, Tokyo (JP)

(72) Inventors: Matthew Lawrenson, Bussigny (CH); Nicholas Walker, Middlesex (GB); Masaaki Isozu, Tokyo (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 16/491,816

(22) PCT Filed: Dec. 26, 2017

(86) PCT No.: PCT/JP2017/046506
§ 371 (c)(1),
(2) Date: Sep. 6, 2019

(87) PCT Pub. No.: WO2018/168152
PCT Pub. Date: Sep. 20, 2018

(65) Prior Publication Data
US 2020/0042726 A1 Feb. 6, 2020

(30) Foreign Application Priority Data
Mar. 13, 2017 (JP) .............................. JP2017-047468

(51) Int. Cl.
H04L 29/06 (2006.01)
G06F 21/62 (2013.01)
(Continued)

(52) U.S. Cl.
CPC .............. G06F 21/62 (2013.01); H04L 9/14 (2013.01); H04L 67/104 (2013.01)

(58) Field of Classification Search
CPC ....... G06F 21/62; G06F 21/6245; H04L 9/14; H04L 67/104; H04L 2209/38;
(Continued)

(56) References Cited

U.S. PATENT DOCUMENTS

2004/0139315 A1 7/2004 Tokutani et al.
2007/0143608 A1* 6/2007 Zeng ..................... H04L 9/3218
713/168

(Continued)

FOREIGN PATENT DOCUMENTS

JP 2004-135004 A 4/2004
JP 2016-115997 A 6/2016

OTHER PUBLICATIONS

Hasswa et al. "Managing Presence and Policies in Social Network Dependent Systems", 10th IEEE International Workshop on Wireless Local Networks, 2010 (Year: 2010).*

(Continued)

Primary Examiner — Taghi T Arani
Assistant Examiner — Lin Chang
(74) Attorney, Agent, or Firm — Wolf, Greenfield & Sacks, P.C.

(57) ABSTRACT

There is provided an information processing apparatus including a processor that generates a plurality of pieces of authority information for obtaining user information classified into a plurality of categories, in which the processor generates the authority information to correspond to each of a plurality of the categories.

9 Claims, 15 Drawing Sheets

(51) Int. Cl.
*H04L 9/14* (2006.01)
*H04L 67/104* (2022.01)

(58) Field of Classification Search
CPC .............. H04L 63/0442; H04L 63/108; H04L 67/1089; G06Q 50/01; G06Q 50/2057; G06Q 10/1053
See application file for complete search history.

(56) References Cited

U.S. PATENT DOCUMENTS

| | | | |
|---|---|---|---|
| 2008/0216177 A1* | 9/2008 | Yokosato | H04N 21/8355 375/E7.009 |
| 2010/0316218 A1 | 12/2010 | Hatakeyama et al. | |
| 2011/0179286 A1* | 7/2011 | Spalka | H04L 9/0869 713/189 |
| 2012/0023332 A1 | 1/2012 | Gorodyansky | |
| 2013/0263206 A1* | 10/2013 | Nefedov | G06F 21/604 726/1 |
| 2014/0122653 A1* | 5/2014 | Hosseini | G06Q 50/01 709/219 |
| 2015/0278546 A1* | 10/2015 | Uekubo | H04L 51/12 726/28 |
| 2016/0140653 A1* | 5/2016 | McKenzie | G07F 7/082 705/69 |
| 2016/0321676 A1 | 11/2016 | McCoy et al. | |
| 2016/0328713 A1 | 11/2016 | Elbrahimi | |
| 2018/0307859 A1* | 10/2018 | LaFever | G16H 10/60 |
| 2020/0090538 A1 | 3/2020 | Lawrenson et al. | |
| 2021/0144223 A1* | 5/2021 | Ourega | G06F 16/958 |

OTHER PUBLICATIONS

Ahmad et al. "Information Retrieval from Social Networks: A Survey", 3rd Int'l Conf. on Recent Advances in Information Technology, 2016 (Year: 2016).*

Buchegger et al. PeerSoN: P2P Social Networking—Early Experiences and Insights, Mar. 2009 (Year: 2009).*

International Search Report and English translation thereof dated Apr. 10, 2018 in connection with International Application No. PCT/JP2017/046506.

Buchegger et al., PeerSoN: P2P Social Networking—Early Experiences and Insights, Proceedings of the $2^{nd}$ ACM workshop on Online social networks, 2009, pp. 46-52.

International Written Opinion and English translation there of dated Apr. 10, 2018 in connection with International Application No. PCT/JP2017/046506.

International Preliminary Report on Patentability and English translation thereof dated Sep. 26, 2019 in connection with International Application No. PCT/JP2017/046506.

Extended European Search Report dated Dec. 6, 2019 in connection with European Application No. 17901087.1.

Japanese Office Action dated Apr. 28, 2020 in connection with Japanese Application No. 2017-047468 and English translation thereof.

[No Author Listed], Sony Global Education Develops Technology Using Blockchain for Open Sharing of Academic Proficiency and Progress Records. Sony Global Education. Feb. 22, 2016. http://www.sony.net/SonyInfo/News/Press/201602/16-0222E/index.html [retrieved on Mar. 29, 2017].

* cited by examiner

INFORMATION PROCESSING APPARATUS AND METHOD FOR PROCESSING INFORMATION

CROSS-REFERENCE TO RELATED APPLICATIONS

This application claims the benefit under 35 U.S.C. § 371 as a U.S. National Stage Entry of International Application No. PCT/JP2017/046506, filed in the Japanese Patent Office as a Receiving Office on Dec. 26, 2017, which claims priority to Japanese Patent Application Number JP2017-047468, filed in the Japanese Patent Office on Mar. 13, 2017, each of which is hereby incorporated by reference in its entirety.

TECHNICAL FIELD

The present disclosure relates to an information processing apparatus, and a method for processing information.

BACKGROUND ART

In recent years, various digital data are exchanged over networks. For example, text data, image data, and animation data are exchanged through the Internet. Volume of digital data exchanged over such networks is enormous, and management of digital data is of great importance.

Patent Document 1 discloses a system for managing digital content. In the system disclosed in Patent Document 1, digital content is managed using a blockchain that is a distributed network system.

CITATION LIST

Patent Document

Patent Document 1: US Patent Application Laid-Open No. 2016/0321676

SUMMARY OF THE INVENTION

Problems to be Solved by the Invention

However, in the system disclosed in Patent Document 1, management of information associated with a user (hereinafter may be referred to as user information) is not taken into consideration. The user information is information associated with privacy, and management of the user information should be carried out in consideration of its special property.

In view of the above, the present disclosure proposes an information processing apparatus and a method for processing information capable of protecting and managing user information.

Solutions to Problems

According to the present disclosure, there is provided an information processing apparatus including a processor that generates a plurality of pieces of authority information for obtaining user information classified into a plurality of categories, in which the processor generates the authority information to correspond to each of a plurality of the categories.

Furthermore, according to the present disclosure, there is provided a method for processing information that causes a computer to perform generating a plurality of pieces of authority information for obtaining user information classified into a plurality of categories, and to generating the authority information to correspond to each of a plurality of the categories.

Effects of the Invention

According to the present disclosure, user information is protected and managed.

Note that the effect described above is not necessarily limited, and any of the effects described in the present specification or another effect that can be understood from the present specification may be exerted in addition to the effect described above or instead of the effect described above.

MODE FOR CARRYING OUT THE INVENTION

Hereinafter, a preferred embodiment of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Note that descriptions will be given in the following order.
0. Overview of Blockchain System
1. Overview of Information Management System
2. Configuration of Devices Included in Information Management System
3. Hierarchization of User Information
4. Use of Social Network Service
5. Method for Processing Information in Information Management System
6. Hardware Configuration of Each Device
7. Supplementary Items
8. Conclusion <0. Overview of Blockchain System>

An information management system according to the present embodiment uses blockchain data distributed in a peer-to-peer network. In view of the above, a blockchain system will be described first. Note that the peer-to-peer network may be called a peer-to-peer distributed file system. Hereinafter, the peer-to-peer network may be referred to as a "P2P network".

Figure 1:
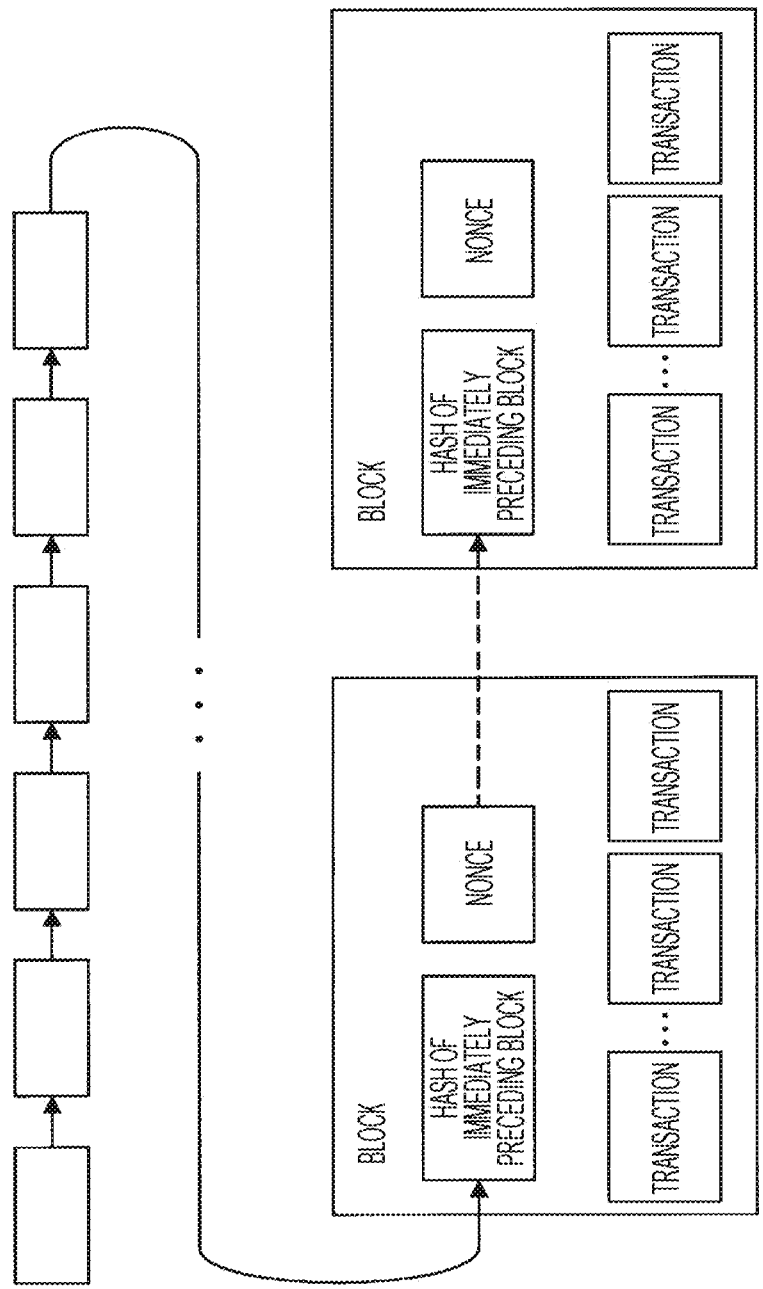
FIG. 1 is a diagram schematically illustrating a blockchain system according to an embodiment of the present disclosure.

As illustrated in FIG. 1, blockchain data according to the present embodiment is data including a plurality of blocks continuously arranged in chains. One or more target data can be stored in each block as a transaction.

Examples of the blockchain data according to the present embodiment include blockchain data used for exchange of data of virtual currency, such as Bitcoin. The blockchain data used for exchange of data of virtual currency includes, for example, a hash of the immediately preceding block, and a special value called a nonce. The hash of the immediately preceding block is used to determine whether or not it is a "correct block" in a correct sequence from the immediately preceding block. A nonce is used to prevent impersonation in authentication using a hash, and tampering is prevented by using the nonce. Examples of the nonce include data indicating a character string, a numerical string, or a combination thereof.

Furthermore, in the blockchain data, data of each transaction is subject to application of an electronic signature using an encryption key, or is encrypted using an encryption key. Furthermore, data of each transaction is published and shared across the entire P2P network. Note that, depending on the blockchain system, the same record may not necessarily be held in the entire P2P network.

Figure 2:
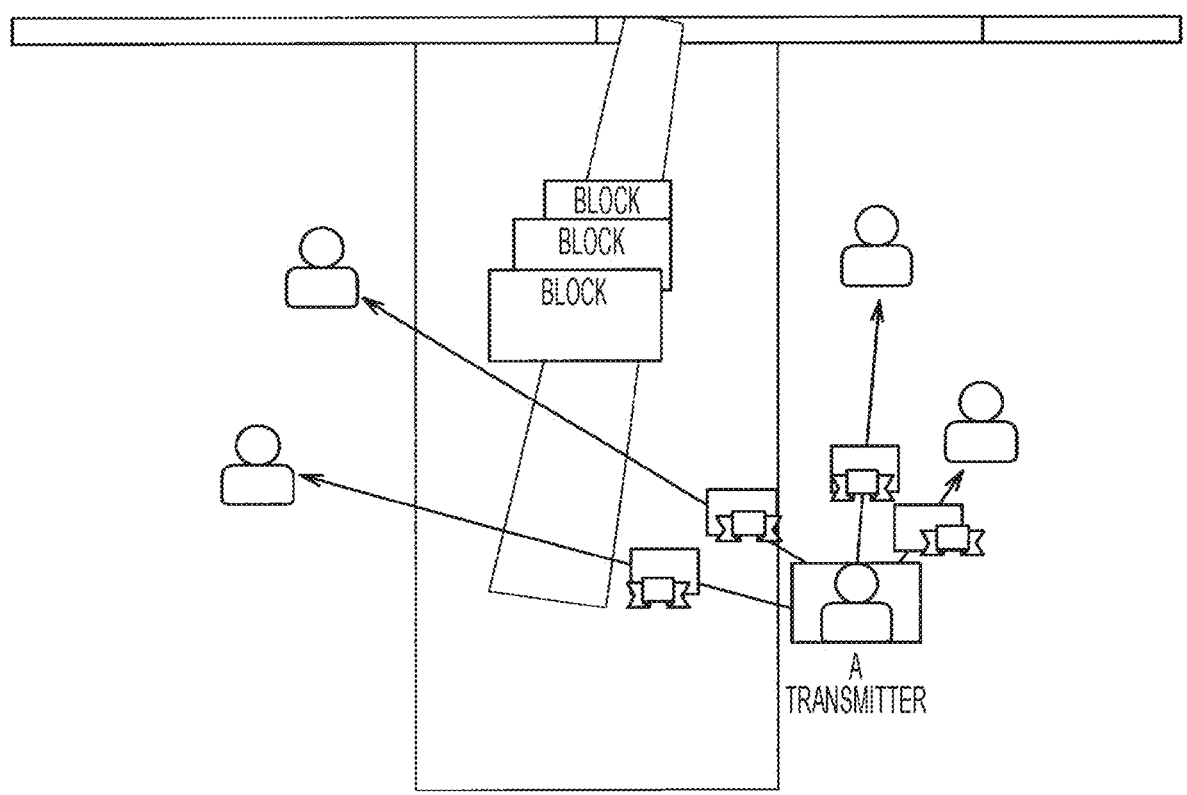
FIG. 2 is another diagram schematically illustrating the blockchain system according to the embodiment of the present disclosure.

FIG. 2 is a diagram illustrating how target data is registered by a user A in the blockchain system. The user A electronically signs the target data to be registered in the blockchain data using a private key of the user A. Then, the user A broadcasts the transaction including the electronically signed target data on the network. This ensures that the owner of the target data is the user A.

Figure 3:
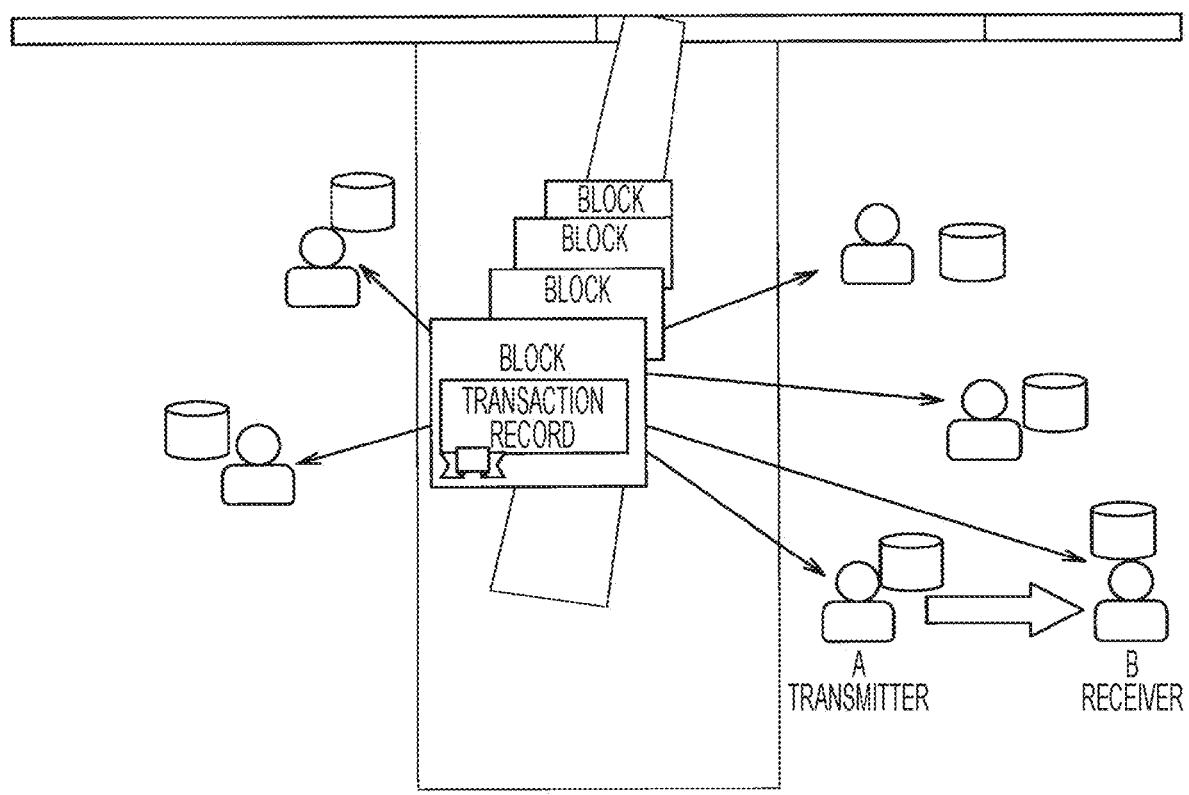
FIG. 3 is still another diagram schematically illustrating the blockchain system according to the embodiment of the present disclosure.

FIG. 3 is a diagram illustrating how the target data is migrated from the user A to a user B in the blockchain system. The user A electronically signs the transaction using the private key of the user A, and includes a public key of the user B in the transaction. This indicates that the target data has been migrated from the user A to the user B. Furthermore, upon the transaction of the target data, the user B may obtain a public key of the user A from the user A, and may obtain the electronically signed or encrypted target data.

Furthermore, in the blockchain system, by using a side chain technique, for example, it is possible to include, in the blockchain data used to exchange data of existing virtual currency such as the blockchain data of Bitcoin, other target data different from the virtual currency. Here, other target data different from the virtual currency in the present embodiment is user information.

In this manner, with the blockchain data being used to manage the user information to be described later, the user information is held on the network without being tampered. Furthermore, with the blockchain data being used, a third party who wishes to use the information included in the blockchain can access the information included in the blockchain on the basis of predetermined authority.

<1. Overview of Information Management System>

The foregoing has described the blockchain system used in the information management system according to the embodiment of the present disclosure. Hereinafter, an overview of the information management system according to the embodiment of the present disclosure will be described.

Figure 4:
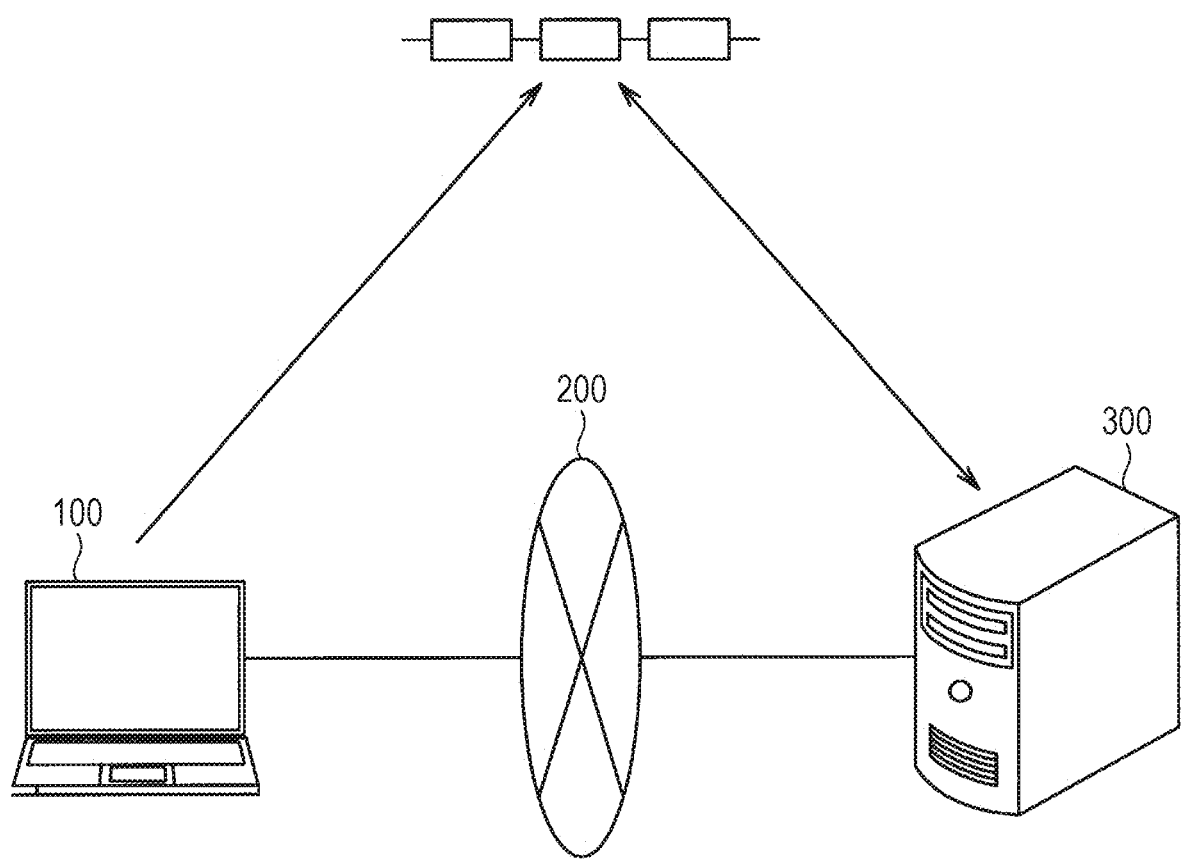
FIG. 4 is a diagram schematically illustrating a configuration of an information management system according to the embodiment of the present disclosure.

FIG. 4 is a diagram illustrating a configuration of the information management system according to the present embodiment. The information management system according to the present embodiment includes an information management apparatus 100, a network 200, and an information browsing apparatus 300. Note that the information management apparatus 100 and the information browsing apparatus 300 are an example of an information processing apparatus that executes information processing according to the present embodiment.

The information management apparatus 100 is, for example, an apparatus used to register user information in the blockchain data. Specifically, the information management apparatus 100 may be a computer owned by a user who registers user information. Here, as will be described later, the user information is hierarchically managed. That is, the user information is hierarchically registered in the blockchain data. Furthermore, the hierarchical user information is registered in the blockchain data such that the user information is obtained using different authority information. For example, the authority information may be key information used to electronically sign or encrypt the user information. In a case where the authority information is key information, the user information may be subject to electronic signature or encryption using the key information, and may be registered in the blockchain data. This allows the user to disclose information at a level corresponding to a hierarchy to a third party. That is, for example, the user can allow a trusted third party to browse information with a higher privacy level, and can allow a non-trusted third party to browse information with a lower privacy level.

The information browsing apparatus 300 performs processing for browsing the user information registered in the blockchain data on the basis of information from the information management apparatus 100. Specifically, the information browsing apparatus 300 may be a computer owned by a user who wishes to browse user information of different users. As will be described later, the information browsing apparatus 300 can browse the user information managed by the blockchain data by transmitting a request for browsing information to the information management apparatus 100 and obtaining authority information for browsing the information.

With the user information being managed in this manner, the user can allow a third party who wishes to browse information to browse information at an appropriate privacy level depending on credibility of the third party.

Furthermore, as will be described later, in the information management system according to the present embodiment, a social network service may be used in processing related to a browsing request from the information browsing apparatus 300 described above and processing related to transmission of the authority information from the information management apparatus 100. In the social network service, each user establishes a relationship with a trusted person or organization.

Therefore, by utilizing the nature of such a social network service and the relationship between users in the social network service, the user information can be managed more easily and more properly.

<2. Configuration of Devices Included in Information Management System>

The foregoing has described the overview of the information management system according to the embodiment of the present disclosure. Hereinafter, configurations of devices included in the information management system according to the embodiment of the present disclosure will be described. Note that an exemplary case where key information is used as the authority information for obtaining the user information will be described hereinafter. However, in the present embodiment, the authority information may be any information for obtaining the user information.

(2-1. Configuration of Information Management Apparatus 100)

Figure 5:
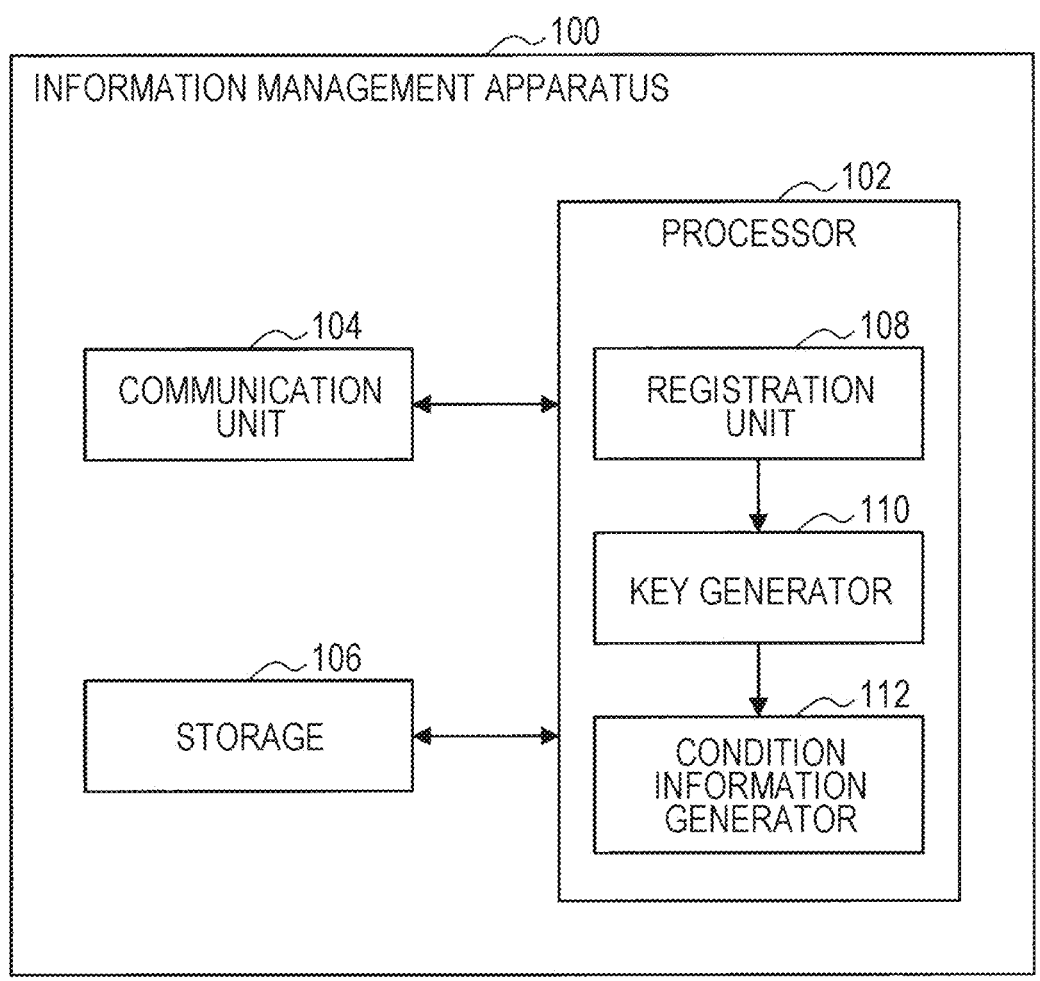
FIG. 5 is a block diagram illustrating an exemplary functional configuration of an information management apparatus according to the embodiment of the present disclosure.

FIG. 5 is a diagram illustrating an exemplary configuration of the information management apparatus 100 according to the present embodiment. The information management apparatus 100 includes, for example, a processor 102, a communication unit 104, and a storage 106. Furthermore, the processor 102 includes a registration unit 108, a key generator 110, and a condition information generator 112.

The processor 102 processes signals from each component of the information management apparatus 100. For example, the processor 102 decodes the signals transmitted from the communication unit 104, and extracts data. In addition, the processor 102 may read data from the storage 106 to perform processing on the read data.

For example, the registration unit 108 stratifies the user information stored in the storage 106, and registers the hierarchical user information in the blockchain data using the key information generated by the key generator 110. Here, the hierarchical user information may be encrypted using the key information and registered in the blockchain data. Furthermore, the hierarchical user information may be signed using the key information and registered in the blockchain data. The hierarchization of the user information will be described later.

Note that the user information may include information associated with a name, age, address, telephone number, and physical information of the user. Here, the physical information may include information associated with height, weight, and a health condition of the user.

Furthermore, the user information may include, for example, information associated with education received by the user, and information associated with the user in an organization (e.g., company) to which the user belongs. The information associated with education received by the user may include information associated with a graduated school, faculty, department, and course. Furthermore, the information associated with education received by the user may include information associated with a degree, credits, and scores obtained by the user. Furthermore, the information associated with the user in the company at which the user serves may include, for example, information associated with a company name, a department name, service years, a job title, and salary.

As described above, the key generator 110 generates key information used to encrypt the hierarchical user information or to sign the hierarchical user information. For example, the key information may be generated using a public key cryptosystem. Specifically, with regard to the key information, a plurality of public keys may be generated from one private key. Then, one of the plurality of generated public keys is associated with one of the hierarchies of the user information on a one-to-one basis. That is, the key generator 110 generates key information to correspond to each of the plurality of hierarchies.

Furthermore, with regard to the key information, a plurality of public keys may be generated from a plurality of private keys. Furthermore, the key information may be generated on the basis of a common key system. In a similar manner to the example described above, one of the plurality of generated keys is associated with one of the hierarchies of the user information on a one-to-one basis.

The condition information generator 112 generates browsing information to be sent to the information browsing apparatus 300. The information browsing apparatus 300 is capable of obtaining the user information from the blockchain data according to the browsing information. The browsing condition may include information associated with the number of times the user information can be obtained (browsed) and a period. Furthermore, the browsing condition may include information associated with the number of times of transfer or the number of transfer steps of the above-described key information or the obtained user information in a social network service to be described later. The number of steps indicates the number of times information is transferred from one user to another user in the social network service. For example, in a case where information is transferred from the user A to the user B on the social network service, the number of steps is one. Moreover, in a case where the information is further transferred from the user B to a user C, the number of steps information is transferred is two.

The communication unit 104 is a communication unit that communicates with an external device by wired communication or wireless communication, which may perform communication using, for example, a communication scheme in conformity with Ethernet (registered trademark). The storage 106 stores various kinds of data used by the processor 102.

(2-2. Configuration of Information Browsing Apparatus 300)

The foregoing has described the configuration of the information management apparatus 100 according to the embodiment of the present disclosure. Hereinafter, a configuration of the information browsing apparatus 300 according to the embodiment of the present disclosure will be described.

Figure 6:
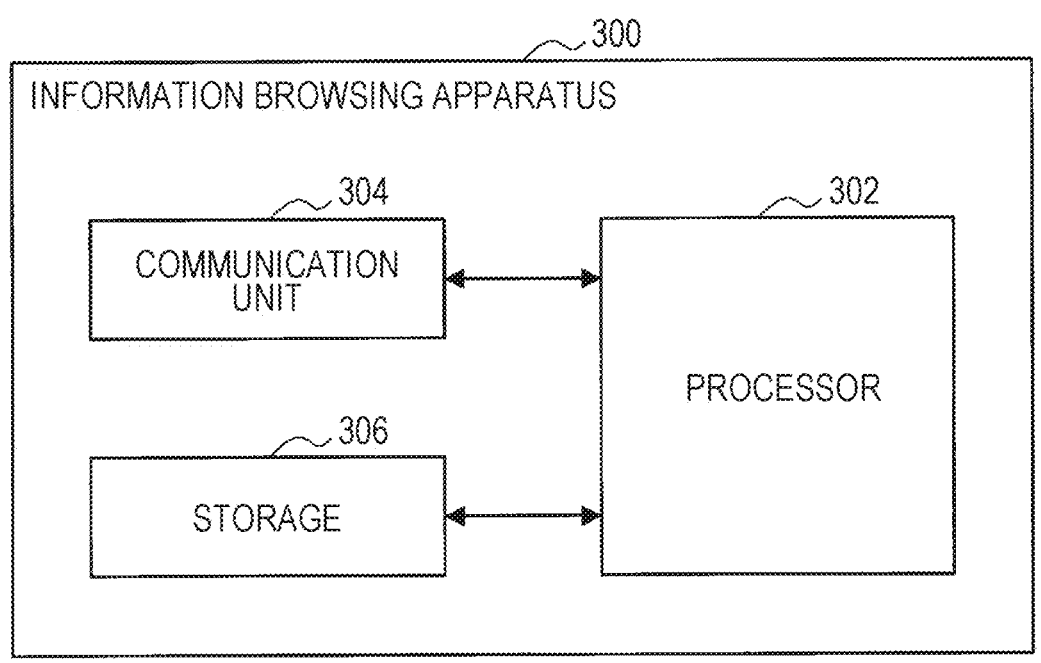
FIG. 6 is a block diagram illustrating an exemplary functional configuration of an information browsing apparatus according to the embodiment of the present disclosure.

FIG. 6 is a diagram illustrating an exemplary configuration of the information browsing apparatus 300 capable of performing processing of a method for processing information according to the present embodiment. The information browsing apparatus 300 includes, for example, a processor 302, a communication unit 304, and a storage 306.

The processor 302 processes signals from each component of the information browsing apparatus 300. For example, the processor 302 decodes the signals transmitted from the communication unit 304, and extracts data. In addition, the processor 302 reads data from the storage 306 to perform processing on the read data.

The communication unit 304 is a communication unit that communicates with an external device by wired communication or wireless communication, which may perform communication using, for example, a communication scheme in conformity with Ethernet (registered trademark). The storage 306 stores various kinds of data used by the processor 302.

<3. Hierarchization of User Information>

The foregoing has described the configuration of each of the devices included in the information management system according to the embodiment of the present disclosure. Hereinafter, the hierarchization of the user information according to the present embodiment will be described.

(3-1. Case of User Information Associated with Education)

Figure 7:
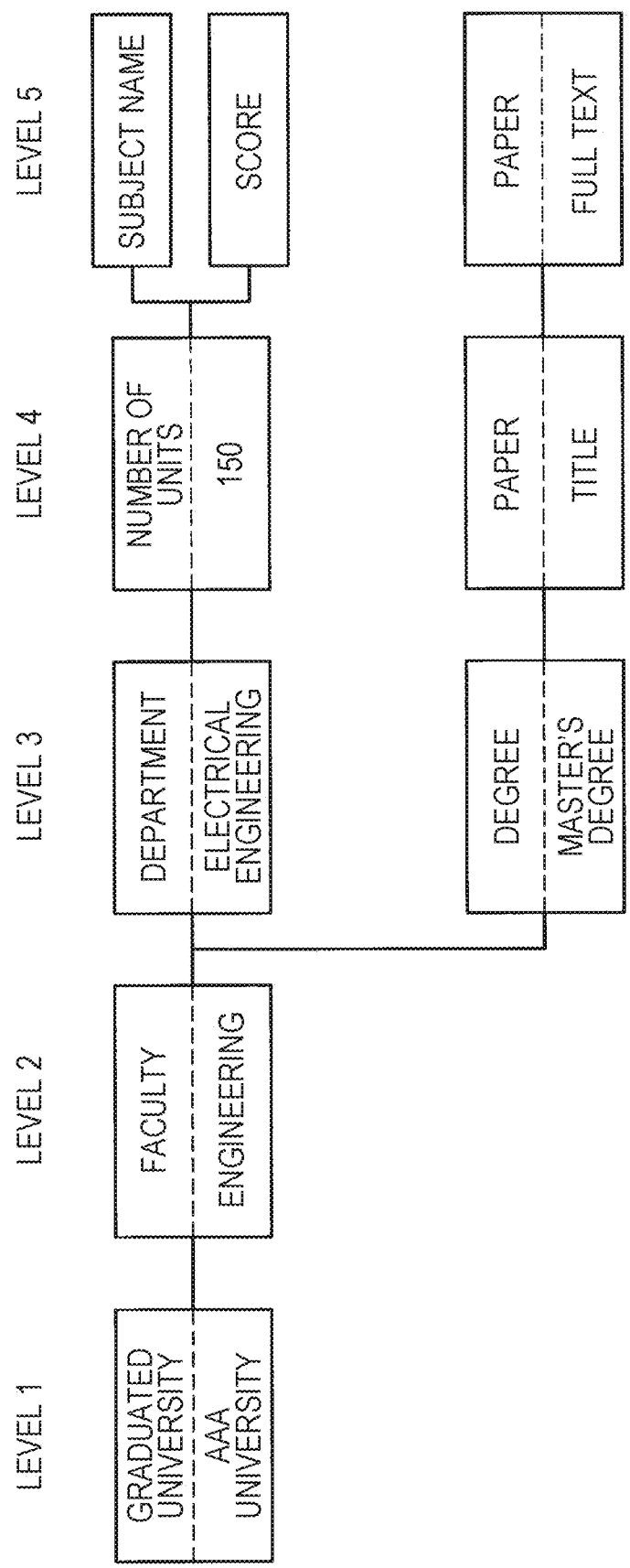
FIG. 7 is a diagram illustrating exemplary hierarchical user information according to the embodiment of the present disclosure.

FIG. 7 is a diagram illustrating an example of the user information stratified by the information management apparatus 100 according to the present embodiment. In particular, FIG. 7 illustrates the hierarchization of user information associated with education.

As illustrated in FIG. 7, in the present embodiment, the user information associated with education includes information such as a school name, a faculty name, a department name, an obtained degree, the number of obtained units, a paper title, a subject name of an obtained unit, a score of the obtained unit, and full text of the paper. Note that those pieces of information are examples, and the user information associated with education is not limited thereto.

In FIG. 7, the user information described above is hierarchical. For example, the school name is classified into a hierarchy at level 1. Furthermore, the faculty name is classified into a hierarchy at level 2. Furthermore, the department name and the obtained degree are classified into a hierarchy at level 3. Furthermore, the number of obtained units and the paper title are classified into a hierarchy at level 4. Furthermore, the subject name of the obtained unit, the score of the obtained unit, and the full text of the paper are classified into a hierarchy at level 5.

As understood from FIG. 7, the user information is classified into a hierarchy with larger numbers as the privacy level of the information is higher. Furthermore, the user information is classified into a hierarchy with larger numbers as information volume of the information is larger. Note that the method of classification of the user information described above is an example, and the method of classification is not limited thereto. For example, the user information may be categorized according to periods related to the user information. That is, the user information may be categorized according to predetermined periods, such as every three years.

The hierarchization of the user information described above may be automatically performed by the registration unit 108. That is, when the user stores the user information associated with education in the storage 106, the registration unit 108 may automatically classify the user information. Furthermore, the hierarchization of the user information may be manually performed by the user.

As described above, the registration unit 108 encrypts the hierarchical user information using the key information or signs the hierarchical user information using the key information to register the use information in the blockchain data. At this time, the encryption and the signature are performed such that, by different key information, the user information of the corresponding hierarchy is obtained. That is, the user information included in level 1 is encrypted or signed to be obtained by key information A. Furthermore, the user information included in level 2 is encrypted or signed to be obtained by key information B. The user information included in level 3 is encrypted or signed to be obtained by key information C. The user information included in level 4 is encrypted or signed to be obtained by key information D. The user information included in level 5 is encrypted or signed to be obtained by key information E.

Here, as described above, the key information used for the encryption or the signature is generated by the key generator 110 using the encryption technique of the common key cryptosystem or the public key cryptosystem. As described above, in the present embodiment, the user information is stratified, encrypted or signed to be obtained using the key information corresponding to the hierarchy, and registered in the blockchain data.

(3-2. Case of User Information Associated with Company)

The foregoing has described the hierarchization of the user information associated with education according to the present embodiment. Hereinafter, hierarchization of the user information associated with a company according to the present embodiment will be described.

Figure 8:
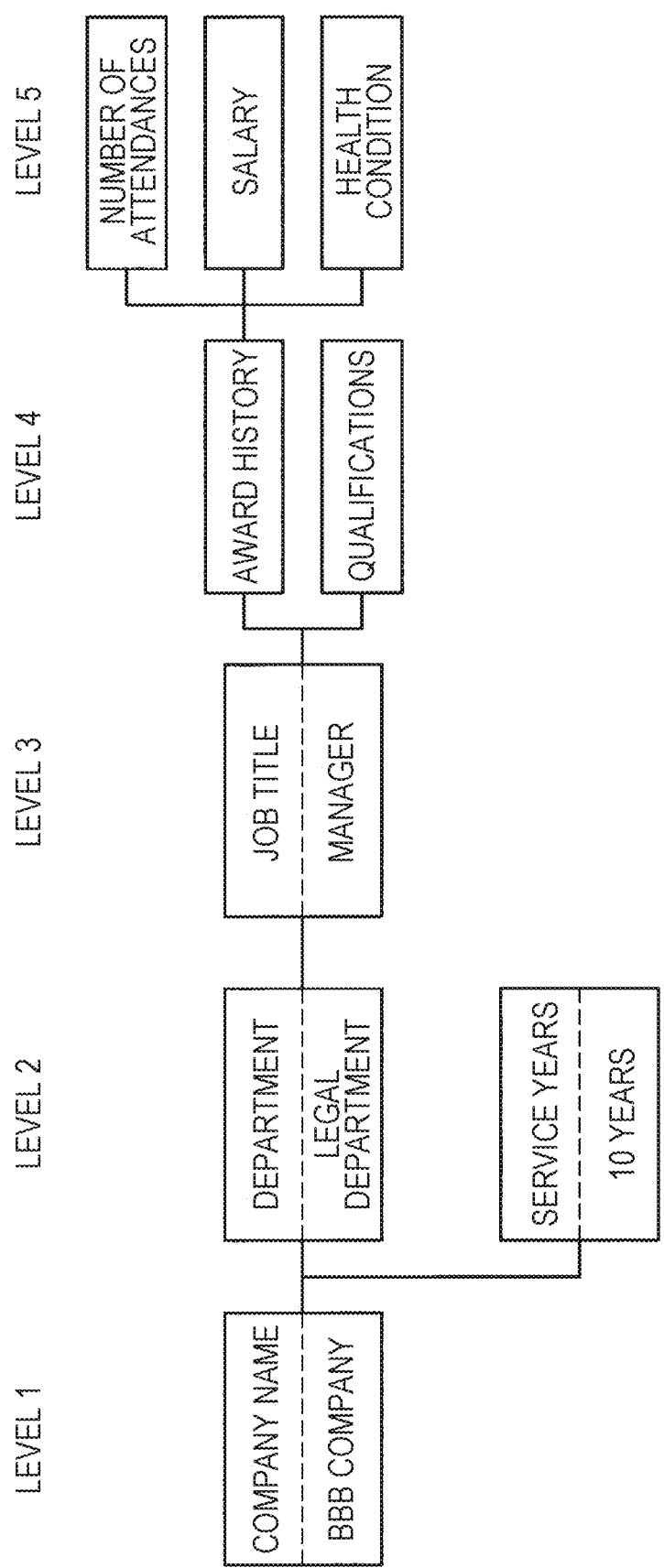
FIG. 8 is a diagram illustrating another example of the hierarchical user information according to the embodiment of the present disclosure.

FIG. 8 is a diagram illustrating an example of the user information stratified by the information management apparatus 100 according to the present embodiment. In particular, FIG. 8 illustrates the hierarchization of the user information associated with a company.

As illustrated in FIG. 8, in the present embodiment, the user information associated with a company includes information such as a company name, a department name, service years, a job title, an award history, qualifications, the number of attendances, salary, and a health condition. Note that those pieces of information are examples, and the user information associated with a company is not limited thereto.

In FIG. 8, the user information described above is hierarchical. For example, the company name is classified into a hierarchy at level 1. Furthermore, the department name and the service years are classified into a hierarchy at level 2. Furthermore, the job title is classified into a hierarchy at level 3. Furthermore, the award history and the qualifications are classified into a hierarchy at level 4. Furthermore, the number of attendances, the salary, and the health condition are classified into a hierarchy at level 5.

In a similar manner to FIG. 7, the user information is classified into a hierarchy with larger numbers as the privacy level of the information is higher. Furthermore, the user information is classified into a hierarchy with larger numbers as information volume of the information is larger. Furthermore, in a similar manner to the example described above, the hierarchical user information is encrypted or signed to be obtained with different key information. Note that the method of classification of the user information described above is an example, and the method of classification is not limited thereto. For example, the user information may be categorized according to periods related to the user information. That is, the user information may be categorized according to predetermined periods, such as every three years.

Note that, in the examples of FIGS. 7 and 8 described above, the user information is classified into five levels. However, the number of classification levels is not limited to five. For example, the user information may be classified into three levels, or may be classified into ten levels.

As described above, the user information is stratified and managed, whereby the user information can be managed according to the privacy level of the user information. Furthermore, the user information is managed using the key information corresponding to a hierarchy, whereby the user can disclose the user information corresponding to credibility of a viewer.

<4. Use of Social Network Service>

The foregoing has described the hierarchization of the user information according to the present embodiment. Hereinafter, use of the social network service according to the present embodiment will be described.

Figure 9:
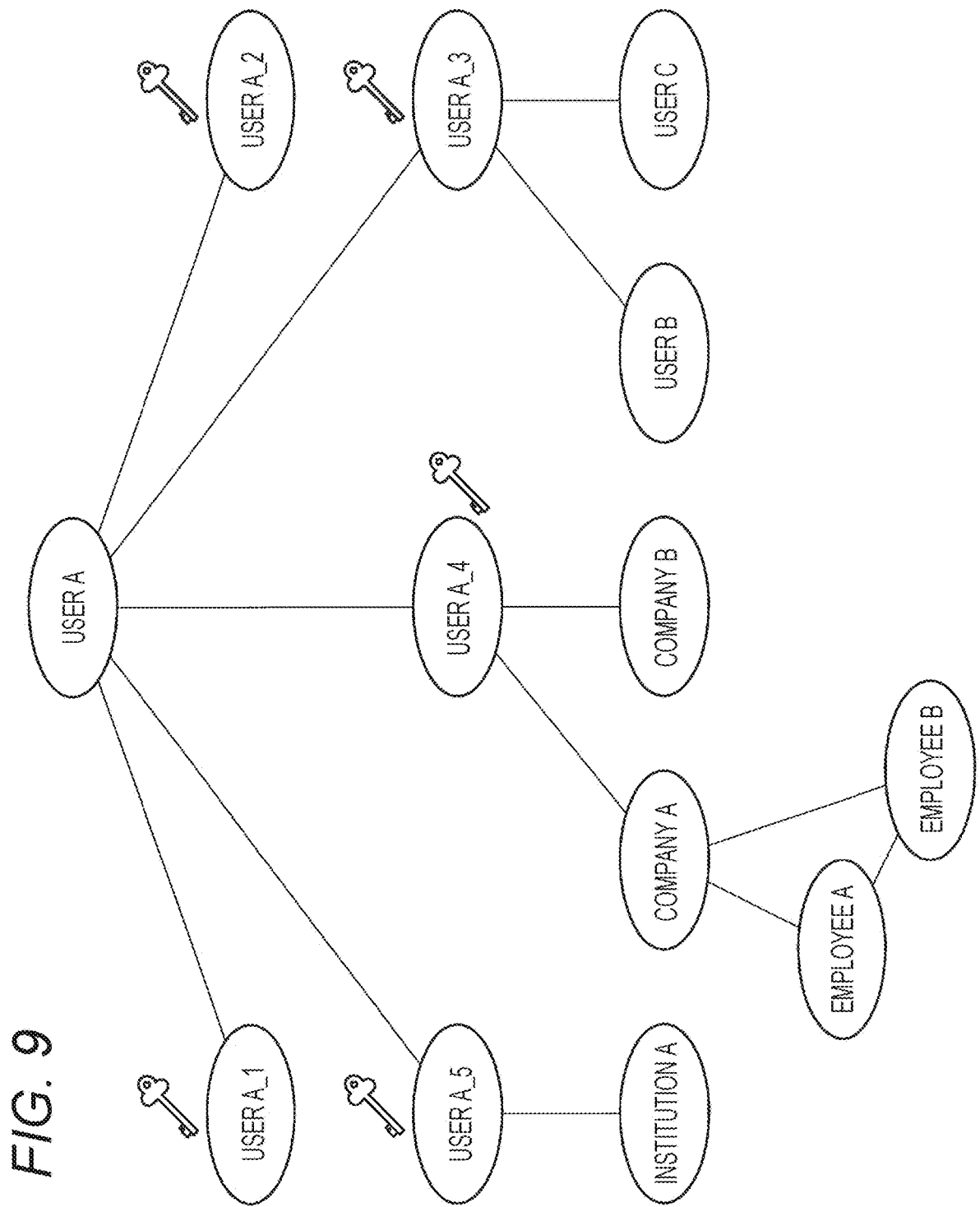
FIG. 9 is a diagram illustrating an exemplary relationship between users in a social network service used in the embodiment of the present disclosure.

FIG. 9 is a diagram illustrating an exemplary relationship between accounts of the social network service used in the present embodiment. For example, in FIG. 9, the user A has five accounts in the social network service. Further, each of the accounts is associated with the key information for obtaining the user information included in the hierarchy of the user information described with reference to FIGS. 7 and 8.

Specifically, a user A_1 account is associated with the key information for obtaining the user information included in the hierarchy at level 1. Furthermore, a user A_2 account is associated with the key information for obtaining the user information included in the hierarchy at level 2. A user A_3 account is associated with the key information for obtaining the user information included in the hierarchy at level 3. A user A_4 account is associated with the key information for obtaining the user information included in the hierarchy at level 4. A user A_5 account is associated with the key information for obtaining the user information included in the hierarchy at level 5.

Further, each of the accounts is linked to an account of another user. In FIG. 9, connection between accounts is indicated by lines. Furthermore, the connection between accounts may be called a link. The link between accounts may be formed in such a manner that, for example, the user A transmits an application to another user and the other user who has received the application approves the application. Furthermore, the link between accounts may be formed in such a manner that another user transmits an application to the user A and the user A who has received the application approves the application.

In FIG. 9, a link is formed between the user A_5 account and an account of an institution A. Furthermore, links are formed between the user A_4 account and accounts of a company A and a company B. Furthermore, links are formed between the user A_3 account and accounts of the user B and the user C. Furthermore, links are formed between the account of the company A and employees A and B of the company A. Note that links related to the user A_1 account and the user A_2 account are omitted in FIG. 9.

As will be described later, in the information management system according to the present embodiment, the relationship between accounts of the social network service described above is used for information processing for obtaining the user information. By utilizing such a relationship between users in the social network service, the user information can be managed more easily and more properly.

Note that different types of user information may be managed using different types of social network systems. For example, the information associated with education of the user may be managed using a Facebook account, and the information associated with an organization (e.g., company) to which the user belongs may be managed using a LinkedIn account. It is likely that Facebook is used in a relationship between friends, and LinkedIn is used for a job search or job changing activities. In this manner, since the nature of each social network service is different, the user information to be managed by an account of each social network service may be different. That is, different types of user information may be managed according to a type of the social network service. Therefore, as described above, with the key information being managed in association with an account, the user information suitable for the nature of each social network service is managed.

In this case, the user may have a plurality of accounts for managing the hierarchical user information in each social network service. That is, the user may have five different accounts in Facebook to manage the user information associated with education stratified from level 1 to level 5. Furthermore, the user may have five different accounts in LinkedIn to manage the user information associated with the organization to which the user belongs stratified from level 1 to level 5.

<5. Exemplary Method for Processing Information in Information Management System>

The foregoing has described the use of the social network service according to the present embodiment. Hereinafter, exemplary information processing in the information management system according to the present embodiment will be described.

(5-1. Method for Processing Information for Hierarchically Registering User Information)

Figure 10:
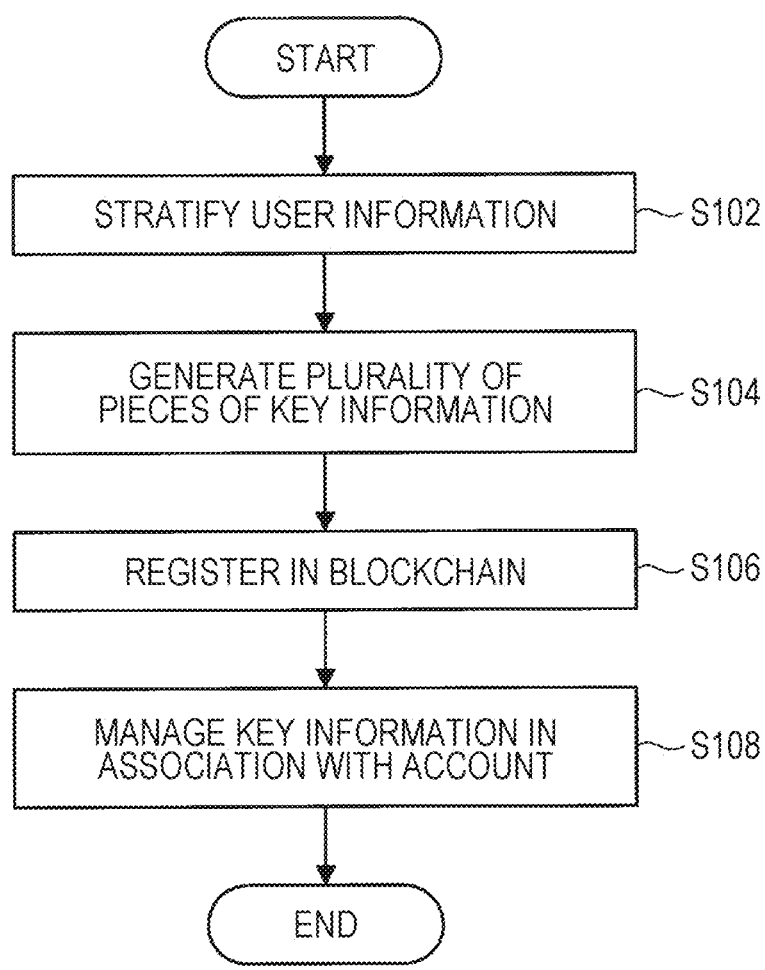
FIG. 10 is a flowchart illustrating an exemplary method for processing information according to the embodiment of the present disclosure.

FIG. 10 is a flowchart illustrating a method for processing information for hierarchically registering the user information in the blockchain data.

In S102, the registration unit 108 stratifies the user information. For example, the registration unit 108 stratifies the user information associated with education of the user or the user information associated with the organization (e.g., company) to which the user belongs. Here, the registration unit 108 may divide and stratify the user information associated with education or the user information associated with a company into five levels as illustrated in FIGS. 7 and 8.

Next, in S104, the key generator 110 generates key information according to the number of levels stratified in S102. For example, in a case where the user information is classified into five levels in S102, the key generator 110 may generate five pieces of key information.

Here, as described above, the key generator 110 may generate the key information on the basis of the public key cryptosystem or the common key cryptosystem. For example, the key generator 110 may generate a plurality of public keys from one private key. Furthermore, the key generator 110 may generate a plurality of public keys from a plurality of private keys. Furthermore, the key generator 110 may generate a plurality of common keys.

In S106, the registration unit 108 encrypts or signs the user information stratified in S102 using the key information generated in S104, and registers the user information in the blockchain data.

In S108, the registration unit 108 associates the user account of the social network service with the key information used for encryption or signature of the user information, and manages the same.

(5-2. First Method for Processing Information for Obtaining User Information)

The foregoing has described the method for processing information for hierarchically registering the user information in the blockchain data according to the present embodiment. Hereinafter, a first method for processing information performed to obtain the user information from the blockchain data according to the present embodiment will be described.

Figure 11:
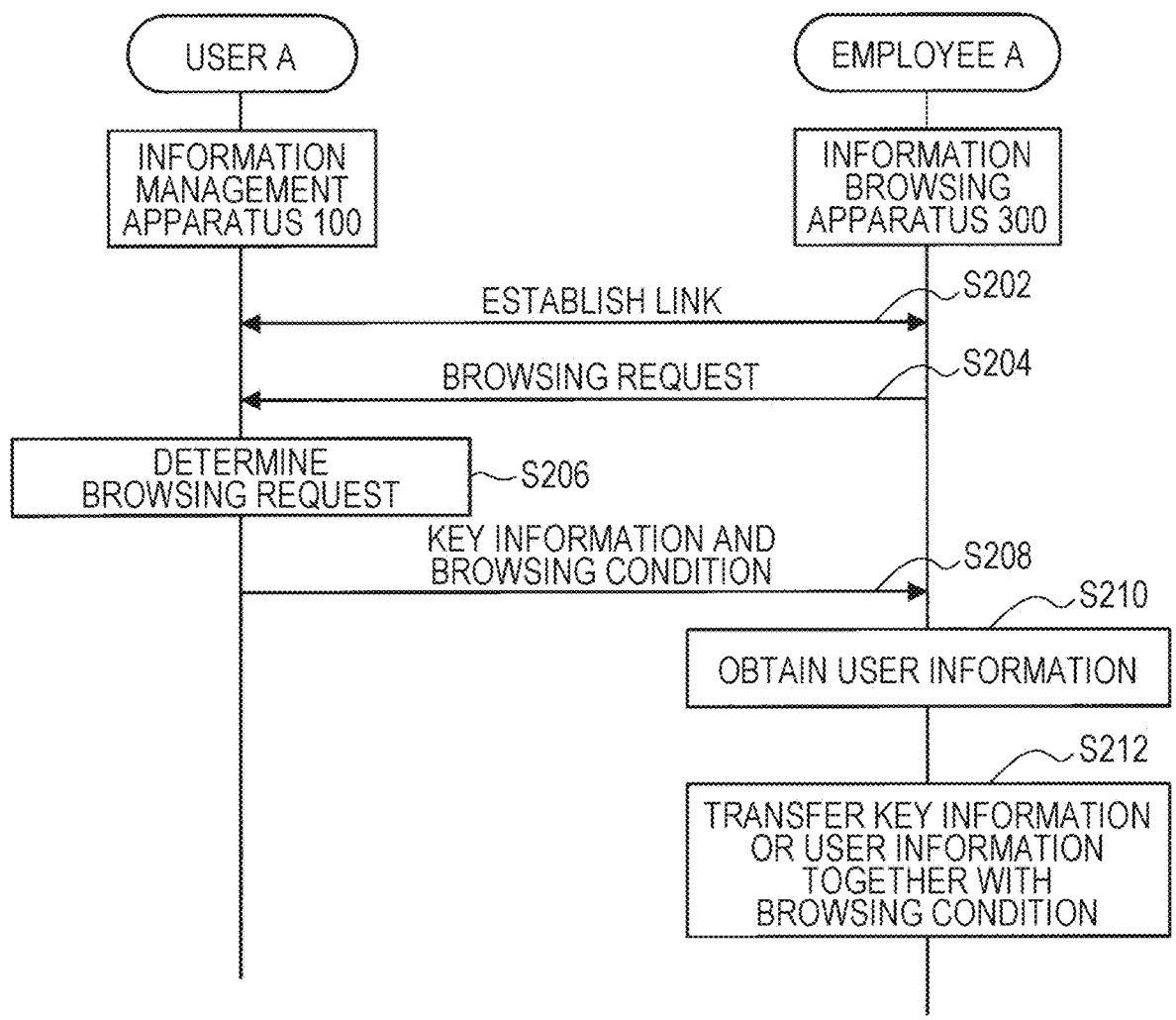
FIG. 11 is a flowchart illustrating another exemplary method for processing information according to the embodiment of the present disclosure.
Figure 12:
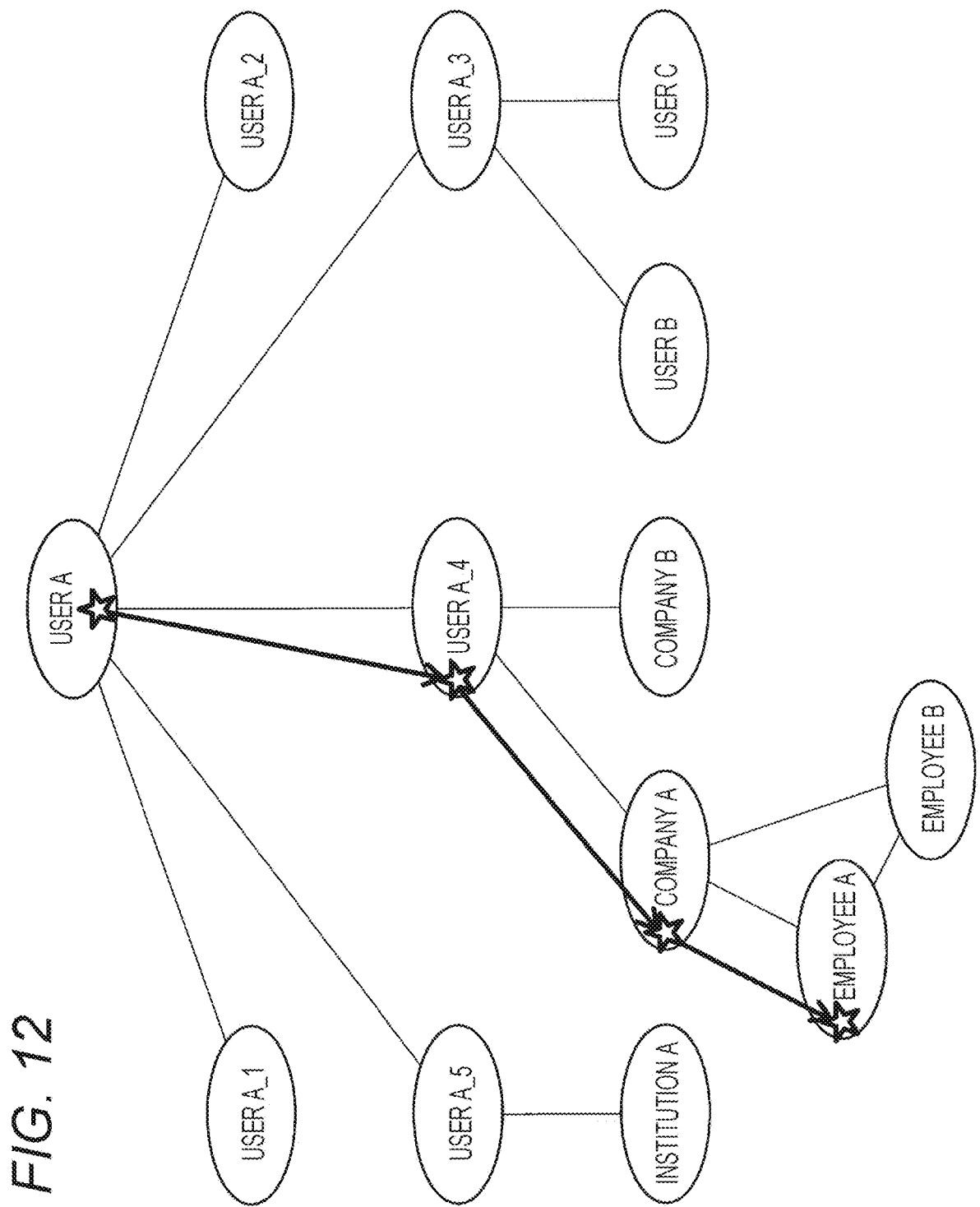
FIG. 12 is a diagram illustrating an exemplary method for transmitting key information and browsing conditions in the social network service used in the embodiment of the present disclosure.

FIGS. 11 and 12 are diagrams illustrating the first method for processing information performed to obtain the user information from the blockchain data. Hereinafter, as illustrated in FIG. 11 or FIG. 12, an example of the method for processing information in the case where the employee A belonging to the human resources department of the company A obtains user information related to the user A using the information browsing apparatus 300 will be described. First, each step of the method for processing information performed to obtain the user information from the blockchain data will be described with reference to FIG. 11.

In S202, the employee A establishes a link with the account of the user A on the social network service using the information browsing apparatus 300. Here, the employee A may establish a link with the account of the user A corresponding to the level of the user information that the employee A wishes to obtain.

Next, in S204, the employee A transmits a user information browsing request to the user A via the social network service. Here, the browsing request may include a message for the user A, information associated with a purpose of the browsing, a level of the user information to be requested, and information associated with a browsing condition.

Here, the browsing condition may include information associated with a time limit within which the employee A can browse the user information, and information regarding whether or not the employee A can transfer the user information to a third party. Here, for example, the information associated with a browsing time limit may include information indicating a predetermined number of days (e.g., 30 days) within which the user information can be browsed, and may include information indicating a date (e.g., until Dec. 31, 2017) until which the browsing is available. Furthermore, the transfer condition may include information associated with the number of possible transfer steps with respect to the link of the social network service.

In this manner, acquisition of the user information is managed according to the browsing condition, thereby managing the user information more flexibly. For example, the user can set a short browsing time limit as a time limit within which information at a higher privacy level can be obtained, and can set a long browsing time limit as a time limit within which information at a lower privacy level can be obtained.

Next, in S206, the condition information generator 112 of the information management apparatus 100 determines the browsing condition received in S204. For example, the condition information generator 112 may determine whether or not the level of the requested user information and the account have an appropriate relationship. That is, in a case where the level of the requested user information is level 4, the condition information generator 112 may determine whether or not the account of the user A with which the link is established in S202 has authority to manage the key information for obtaining the user information at level 4. Furthermore, the condition information generator 112 may also determine the browsing condition or the transfer condition included in the browsing request. Note that the determination in S206 may be manually performed by the user, or may be automatically performed according to a predetermined condition set in advance.

In S208, when the condition information generator 112 determines the browsing request, the condition information generator 112 transmits the browsing condition and the key information for obtaining the user information at the level requested by the browsing request to the information browsing apparatus 300. Here, in a case where the level of the user information requested by the browsing request is level 4, the condition information generator 112 transmits the key information for obtaining the user information at level 4 to the information browsing apparatus 300.

Furthermore, in S208, the condition information generator 112 may transmit a browsing condition different from the browsing condition included in the browsing request in S204 to the information browsing apparatus 300. For example, even in a case where the information associated with a browsing time limit included in the browsing request in S204 is information indicating that a browsing period is 30 days, the condition information generator 112 may transmit the browsing condition in which the browsing period is 15 days to the information browsing apparatus 300. Note that, as a matter of course, the condition information generator 112 may transmit the browsing condition corresponding to the browsing condition included in the browsing request in S204 to the information browsing apparatus 300. For example, in a case where the information associated with a browsing time limit included in the browsing request in S204 is information indicating that the browsing period is 30 days, the condition information generator 112 may transmit the browsing condition in which the browsing period is 30 days to the information browsing apparatus 300.

In S210, the information browsing apparatus 300 obtains the user information from the blockchain data using the key information obtained in S206. Note that the user information and the key information obtained here are managed on the basis of the browsing condition received in S208.

Then, in a case where transfer is permitted under the browsing condition received in S208, in S212, the employee A may transfer the obtained key information or user information to a third party together with the browsing condition received in S208.

FIG. 12 is a diagram illustrating a method for transmitting the key information and the browsing condition on the social network service according to the method for processing information described with reference to FIG. 11. Note that the key information and the browsing condition to be transmitted are denoted by star signs in FIG. 12.

In FIG. 12, the employee A of the company A is indirectly connected to the user A_4, which is one of the accounts of the user A. Here, the user A_4 is an account for managing key information for obtaining user information up to level 4. That is, the user A_4 account and the key information for obtaining the user information up to level 4 are managed in association with each other.

As illustrated in FIG. 12, when the employee A transmits a browsing request using the social network service, the key information and the browsing condition are transmitted from the user A_4 to the employee A. Then, the employee A obtains the user information included in level 4 of the user A from the blockchain data on the basis of the obtained key information and the browsing condition.

Then, in a case where transfer is permitted under the browsing condition, the employee A may transfer, together with the browsing condition, the obtained key information or the user information to the employee B connected by a link.

Furthermore, in the method for processing information described above, virtual currency may be used as a consideration for obtaining information. For example, the browsing request in S204 of FIG. 11 may include information associated with virtual currency as a consideration for obtaining information. For example, the employee A may pay virtual currency to the user A to obtain the user information of the user A. Furthermore, the employee A may pay virtual currency to a business operator operating the system in order to obtain the user information of the user A.

Note that the information associated with virtual currency may not be included in the browsing request. For example, the information management apparatus 100 that has received the browsing request in S204 may determine the consideration for disclosing the user information on the basis of the information included in the browsing request. Then, a consideration request may be issued to the information browsing apparatus 300 on the basis of a result of the determination. Then, the information browsing apparatus 300 that has received the consideration request may transmit the information associated with virtual currency to the information management apparatus 100.

In that case, the information management apparatus 100 may change the consideration to be requested depending on the level of the user information requested by the browsing request. For example, in a case where the user information at a higher privacy level is requested, the information management apparatus 100 may request a large amount of virtual currencies as a consideration.

As described above, it becomes possible to pay a consideration for obtaining information on the same system, whereby the user who uses the information management system according to the present embodiment can easily obtain information and can pay a consideration therefor. Furthermore, virtual currency traded using the blockchain is used to pay the consideration, whereby payment of the consideration and information transaction can be performed in the same blockchain system, and system design can be facilitated.

(5-3. Second Method for Processing Information for Obtaining User Information)

The foregoing has described the first method for processing information performed to obtain the user information from the blockchain data according to the present embodiment according to the present embodiment. Hereinafter, a second method for processing information performed to obtain the user information from the blockchain data according to the present embodiment will be described.

Figure 13:
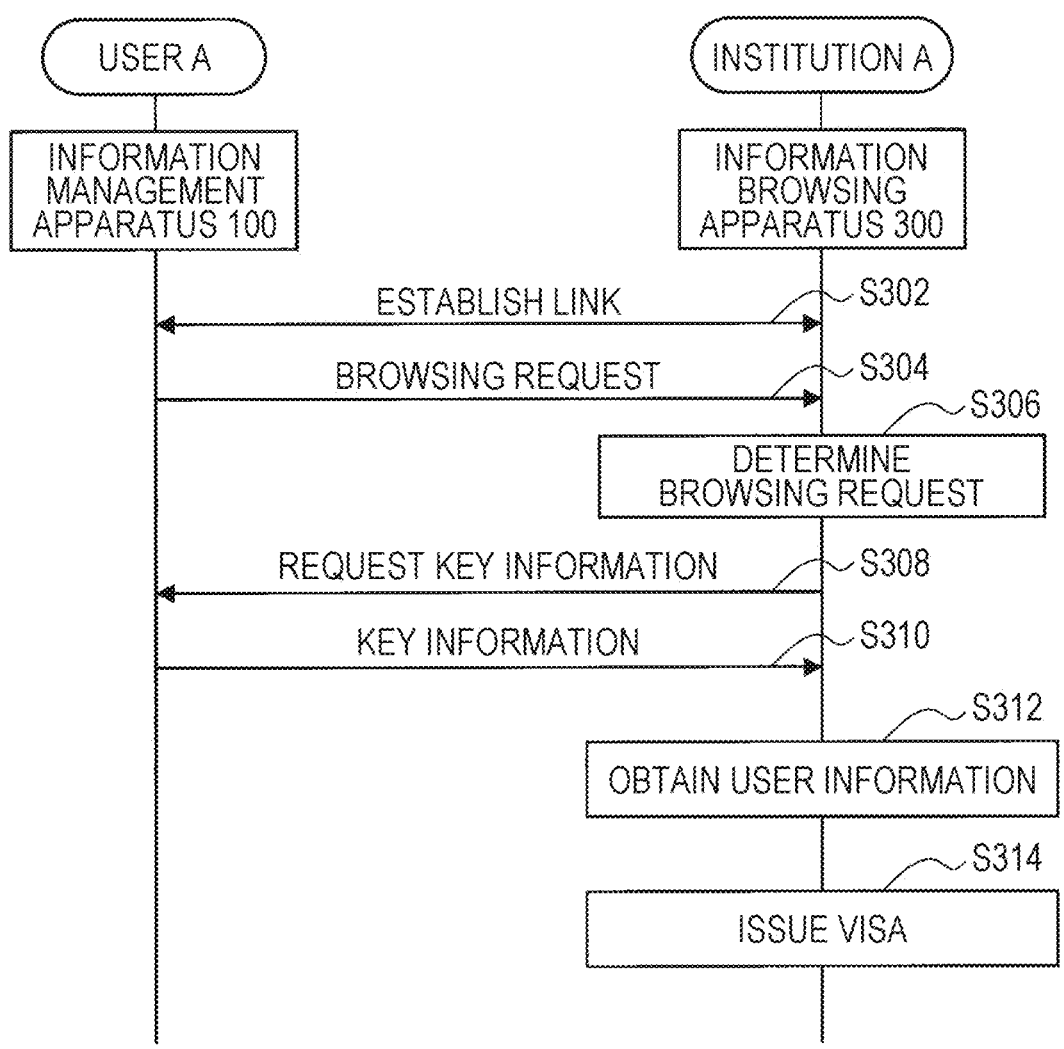
FIG. 13 is a flowchart illustrating still another exemplary method for processing information according to the embodiment of the present disclosure.
Figure 14:
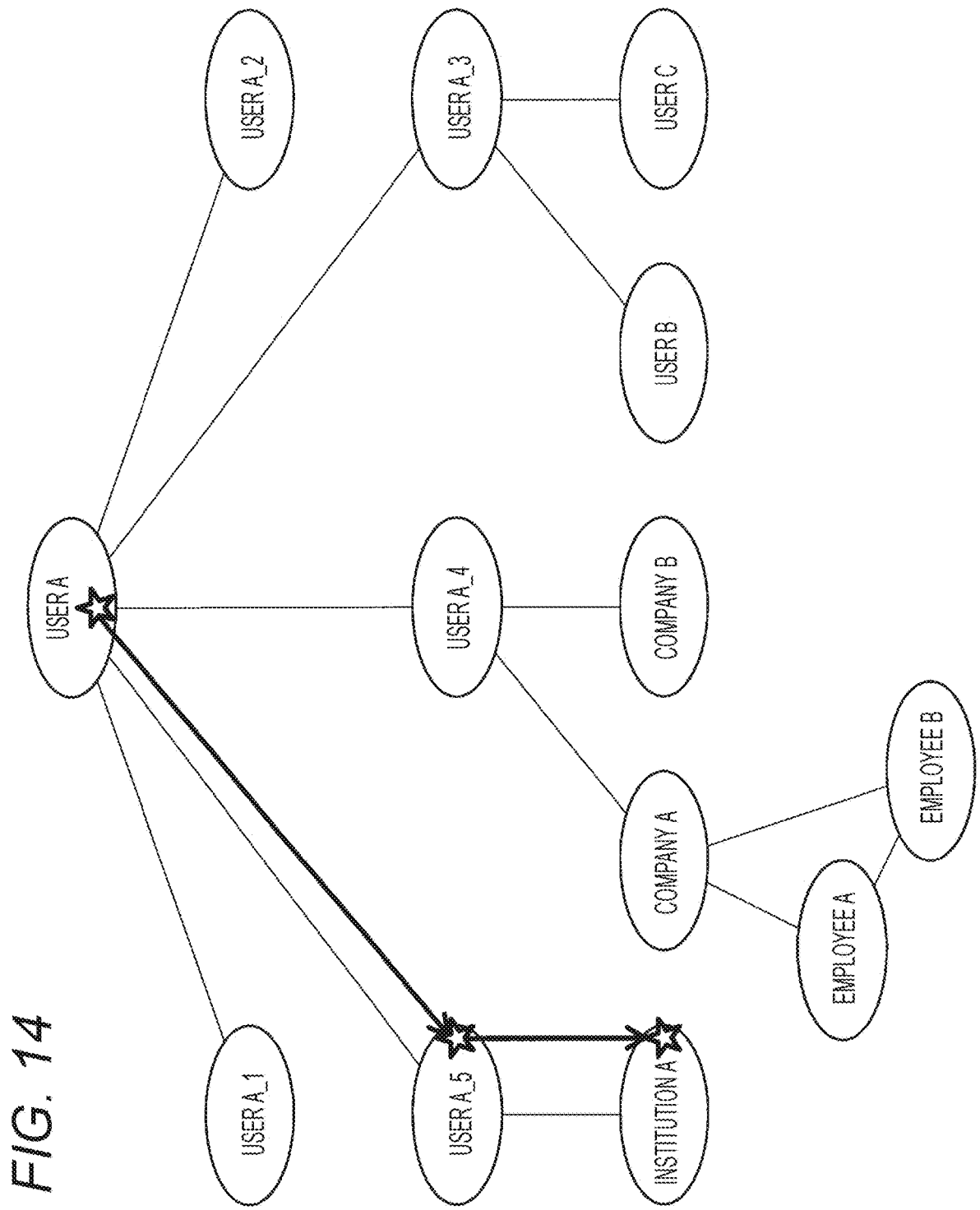
FIG. 14 is a diagram illustrating another exemplary method for transmitting the key information and the browsing conditions in the social network service used in the embodiment of the present disclosure.

FIGS. 13 and 14 are diagrams illustrating the second method for processing information performed to obtain the user information from the blockchain data. Hereinafter, as illustrated in FIG. 13 or FIG. 14, an example of the method for processing information in the case where the user A requests the institution A to issue a certificate (in the examples of FIGS. 13 and 14, visa) will be described. First, each step of the method for processing information performed to obtain the user information from the blockchain data will be described with reference to FIG. 13.

In S302, the user A establishes a link with the account of the institution A on the social network service. Here, the user A may establish the link with the account of the institution A using the account of the user A corresponding to the level of the user information used to issue the certificate. For example, in a case where the user information at level 5 is required to issue the certificate, the user A establishes the link with the institution A using the account (user A_5 account in FIG. 14) that manages the key information for obtaining the user information at level 5.

Next, in S304, the user A transmits a user information browsing request to the institution A via the social network service. Here, the browsing request may include a message for the institution A, a certificate issuance request, a level of the user information that can be browsed, and information associated with a browsing condition.

Next, in S306, the information browsing apparatus 300 of the institution A determines the browsing condition to be received in S304. For example, the information browsing apparatus 300 may determine whether or not the level of the user information permitted to be browsed satisfies the condition for issuing the certificate. Furthermore, the information browsing apparatus 300 may determine whether or not the browsing condition (e.g., period within which the user information can be obtained) satisfies the condition for issuing the certificate.

In S308, when the information browsing apparatus 300 determines that the browsing request satisfies the condition for issuing the certificate, the information browsing apparatus 300 requests the information management apparatus 100 for the key information for obtaining the user information.

In S310, the information management apparatus 100 transmits key information to the information browsing apparatus 300. Then, in S312, the information browsing apparatus 300 obtains the user information from the blockchain data using the key information obtained in S310. Finally, in S314, the institution A issues a visa to the user A using the obtained user information.

Note that, in the method for processing information described above, virtual currency may be used as a consideration for issuing a certificate. For example, the browsing request in S304 of FIG. 13 may include information associated with virtual currency as a consideration for issuing the certificate. For example, the user A may pay virtual currency to the institution A to issue the certificate.

FIG. 14 is a diagram illustrating a method for transmitting the key information and the browsing condition on the social network service according to the method for processing information described with reference to FIG. 13. Note that the key information and the browsing condition to be transmitted are denoted by star signs in FIG. 14.

In FIG. 14, the user A establishes a link between the user A_5, which is one of the accounts of the user A, and the account of the institution A. Here, the user A_5 is an account for managing user information up to level 5. That is, the user A_5 account and the key information for obtaining the user information up to level 5 are managed in association with each other.

As illustrated in FIG. 14, the key information and the browsing condition are transmitted from the user A_5 to the institution A using the social network service. Then, the institution A obtains the user information included in level 5 of the user A from the blockchain data on the basis of the obtained key information and the browsing condition. Then, the institution A issues a certificate for the user A using the obtained user information.

<6. Hardware Configuration of Each Device>

The foregoing has described the information management system and the method for processing information executed in the information management system according to the present embodiment. Hereinafter, a hardware configuration of each device of the information management system will be described.

Figure 15:
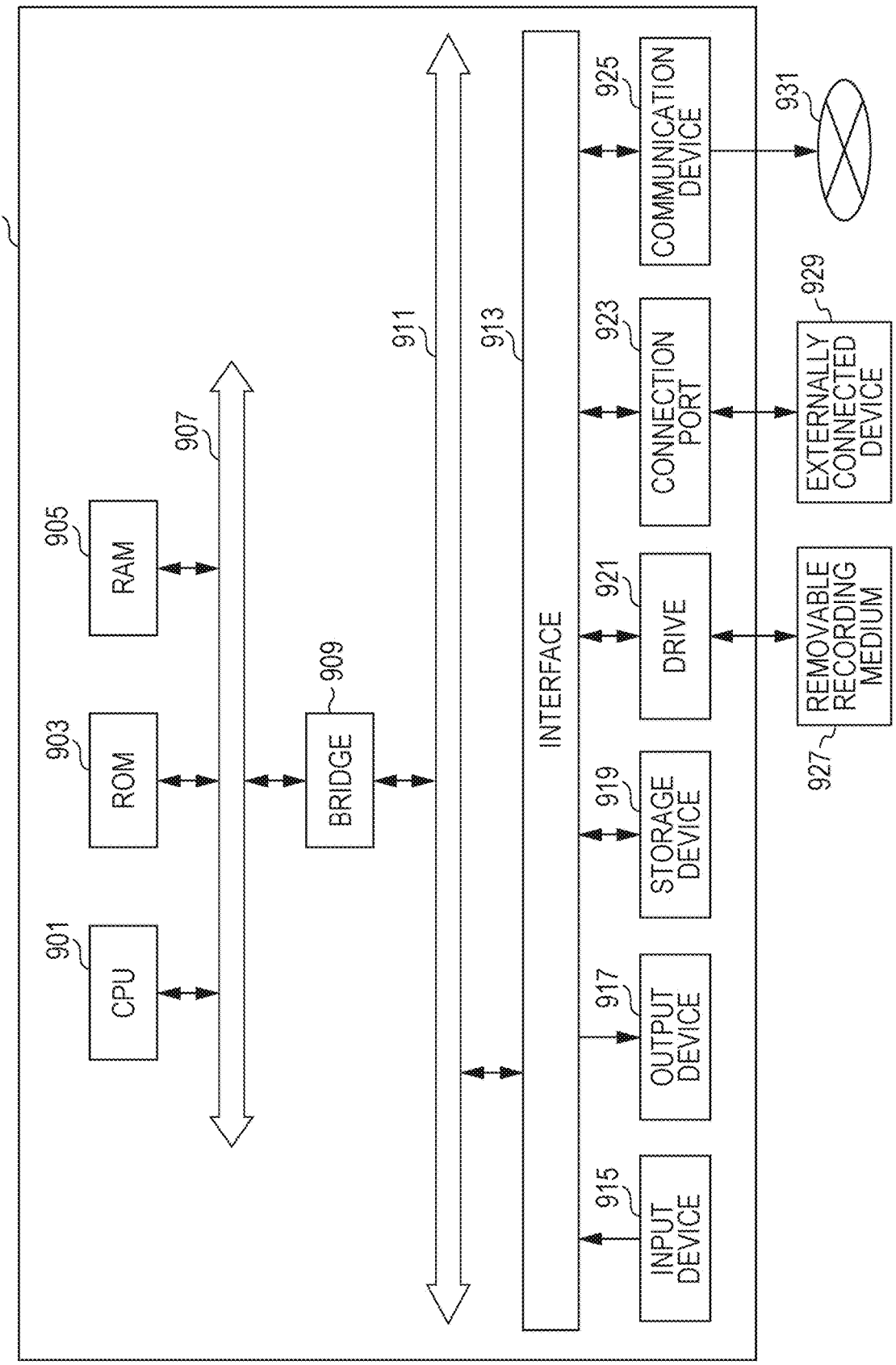
FIG. 15 is a diagram illustrating an exemplary hardware configuration of the information management apparatus and the information browsing apparatus according to the embodiment of the present disclosure.

Hereinafter, a hardware configuration of the information management apparatus 100 and the information browsing apparatus 300 according to the embodiment of the present disclosure will be described in detail with reference to FIG. 15. FIG. 15 is a block diagram for illustrating an exemplary hardware configuration of the information management apparatus 100 and the information browsing apparatus 300 according to the embodiment of the present disclosure.

Hereinafter, a hardware configuration of the information management apparatus 100 and the information browsing apparatus 300 according to the embodiment of the present disclosure will be described in detail with reference to FIG. 15. FIG. 15 is a block diagram for illustrating an exemplary hardware configuration of the information management apparatus 100 and the information browsing apparatus 300 according to the embodiment of the present disclosure.

The information management apparatus 100 and the information browsing apparatus 300 mainly includes a CPU 901, a ROM 903, and a RAM 905. Moreover, the information management apparatus 100 and the information browsing apparatus 300 further include a host bus 907, a bridge 909, an external bus 911, an interface 913, an input device 915, an output device 917, a storage device 919, a drive 921, a connection port 923, and a communication device 925.

The CPU 901 functions as a main processing unit and a control unit, and controls overall operation in the information management apparatus 100 and the information browsing apparatus 300 or a part thereof in accordance with various programs recorded in the ROM 903, the RAM 905, the storage device 919, or a removable recording medium 927. Note that the CPU 901 may have the functions of the processors 102 and 302. The ROM 903 stores programs to be used by the CPU 901, operation parameters, and the like. The RAM 905 primarily stores programs to be used by the CPU 901, parameters that appropriately change in the execution of the programs, and the like. These are mutually connected by the host bus 907 including an internal bus such as a CPU bus.

The input device 915 is an operation means operated by the user, such as a mouse, a keyboard, a touch panel, a button, a switch, and a lever, for example. In addition, the input device 915 includes, for example, an input control circuit or the like that generates input signals on the basis of information input by the user using the operation means mentioned above, and outputs the signals to the CPU 901. The user can input various kinds of data or provide an instruction for processing operation to the information management apparatus 100 and the information browsing apparatus 300 by operating the input device 915.

The output device 917 includes a device capable of visually or aurally notifying the user of the obtained information. Examples of such a device include a display device, such as a CRT display device, a liquid crystal display device, a plasma display device, an EL display device, and a lamp, an audio output device, such as a speaker and a headphone, a printer, a mobile phone, a facsimile, and the like. The output device 917 outputs, for example, results obtained through various kinds of processing performed by the information management apparatus 100 and the information browsing apparatus 300. Specifically, the display device displays the results obtained through various kinds of processing performed by the information management apparatus 100 and the information browsing apparatus 300 as text or images. Meanwhile, the audio output device converts audio signals including reproduced audio data, sound data, and the like into analog signals, and outputs them.

The storage device 919 is a device for storing data, which is an example of the storages 106 and 306 of the information management apparatus 100 and the information browsing apparatus 300. The storage device 919 includes, for example, a magnetic storage device such as a hard disk drive (HDD), a semiconductor storage device, an optical storage device, a magneto-optical storage device, or the like. The storage device 919 stores programs to be executed by the CPU 901, various kinds of data, various kinds of data obtained from the outside, and the like. Note that the storage device 919 may have the functions of the storages 106 and 306.

The drive 921 is a reader/writer for a recording medium, which is incorporated in or externally attached to the information management apparatus 100 and the information browsing apparatus 300. The drive 921 reads out information recorded in the attached removable recording medium 927, such as a magnetic disk, an optical disk, a magneto-optical disk, or a semiconductor memory, and outputs the information to the RAM 905. Furthermore, the drive 921 is also capable of writing a record in the attached removable recording medium 927, such as a magnetic disk, an optical disk, a magneto-optical disk, or a semiconductor memory. The removable recording medium 927 is, for example, a DVD medium, an HD-DVD medium, a Blu-ray (registered trademark) medium, or the like. Furthermore, the removable recording medium 927 may be a CompactFlash (CF) (registered trademark), a flash memory, a secure digital (SD) memory card, or the like. Furthermore, the removable recording medium 927 may be, for example, an integrated circuit (IC) card mounting a contactless IC chip, an electronic device, or the like.

The connection port 923 is a port for directly connecting a device to the information management apparatus 100 and the information browsing apparatus 300. Examples of the connection port 923 include a universal serial bus (USB) port, an IEEE 1394 port, a small computer system interface (SCSI) port, and the like. Other examples of the connection port 923 include an RS-232C port, an optical audio terminal, a high-definition multimedia interface (HDMI) (registered trademark) port, and the like. By connecting an externally connected device 929 to the connection port 923, the information management apparatus 100 and the information browsing apparatus 300 directly obtain various kinds of data from the externally connected device 929, or provide various kinds of data to the externally connected device 929.

The communication device 925 is, for example, a communication interface including a communication device or the like for connecting to a communication network 931. The communication device 925 is, for example, a communication card for wireless USB (WUSB), a wired or wireless local area network (LAN), or the like. Furthermore, the communication device 925 may be a router for optical communication, a router for asymmetric digital subscriber line (ADSL), a modem for various kinds of communication, or the like. For example, the communication device 925 is capable of transmitting and receiving signals or the like in accordance with a predetermined protocol, such as TCP/IP, for example, with the Internet or another communication device. Furthermore, the communication network 931 to be connected to the communication device 925 includes a network connected by wire or wirelessly, or the like, which may be, for example, the Internet, a home LAN, infrared communication, radio wave communication, satellite communication, or the like.

<7. Supplementary Items>

As described above, although the preferred embodiments of the present disclosure have been described in detail with reference to the accompanying drawings, the technical scope of the present disclosure is not limited to such examples. It is apparent to those skilled in the art of the present disclosure that various alterations and modifications can be conceived within the scope of the technical idea described in the appended claims, and such alterations and modifications are also naturally within the technical scope of the present disclosure.

For example, the user information is hierarchically managed in the example described above. However, the user information may be managed by methods other than the hierarchization. For example, the user information may be classified into a plurality of categories and managed according to a predetermined condition. Specifically, the user information may be classified and managed to be associated with the organization to which the user has belonged, such as information in junior high school days, information in high school days, information in university days, information when belonging to the company A, and information when belonging to the company B.

Furthermore, the user information may be classified and managed to be associated with a predetermined period (e.g., elementary school days, junior high school days, high school days, and university days). Furthermore, the user information may be classified and managed for every predetermined period (e.g., every three years). Furthermore, the user information may be classified according to the type of the user information, such as text data and image data. Furthermore, the user information may be classified and managed for every related subject. For example, the user information may be classified and managed for every predetermined subject, such as user information associated with English knowledge of the user, and user information associated with specific technical knowledge of the user.

Then, the above-described classification of the user information and the key information for obtaining the user information included in the classification may be managed in association with each other as described above.

Furthermore, in the example described above, the user account is associated with the key information for obtaining the user information. However, the key information may not be associated with the user account. For example, in a case where the user has one account in the social network service, the information management apparatus 100 may transmit, to the information browsing apparatus 300, the key information corresponding to the browsing request from the information browsing apparatus 300. That is, in a case where the browsing request requests browsing of the user information included in the hierarchy at level 3, the information management apparatus 100 may determine the browsing request and transmit the key information for obtaining the user information included in the hierarchy at level 3 to the information browsing apparatus 300.

Furthermore, in the example described above, the user information is registered in the blockchain data. However, the user information may be registered in a system other than the blockchain. For example, the user information may be managed by a server group constructing a cloud system. Furthermore, the user information may be managed by an existing P2P network.

Furthermore, the information processing according to the present embodiment may be executed by an information processing apparatus such as a smartphone, a tablet computer, a desktop computer, a PDA, an in-vehicle device, and a server.

Furthermore, there may be provided a computer program that causes the processor 102 of the information management apparatus 100 and the processor 302 of the information browsing apparatus 300 to operate as described above with reference to FIGS. 10, 11, and 13. Furthermore, a recording medium storing such a program may be provided.

<8. Conclusion>

As described above, in the information management system according to the present disclosure, user information is hierarchically managed. Furthermore, hierarchical user information is electronically signed or encrypted such that the user information is obtained using different key information. This allows the user to disclose information at a level corresponding to a hierarchy to a third party.

Furthermore, in the information management system according to the present disclosure, management is performed using blockchain data. Accordingly, the user information is managed on the network without being tampered. Furthermore, with the blockchain data being used, a third party who wishes to use the information included in the blockchain can access the information included in the blockchain on the basis of predetermined authority.

Furthermore, in the information management system according to the present disclosure, a social network service may be used in processing related to a browsing request from the information browsing apparatus 300 and processing related to transmission of the authority information from the information management apparatus 100. In this manner, by utilizing the nature of a social network service and the relationship between users in the social network service, the user information can be managed more easily and more properly.

Note that the following configurations are also within the technical scope of the present disclosure.

(1)

An information processing apparatus, including: a processor that generates a plurality of pieces of authority information for obtaining user information classified into a plurality of categories, in which the processor generates the authority information to correspond to each of a plurality of the categories.

(2)

The information processing apparatus according to (1) described above, in which the processor hierarchically classifies the user information into a plurality of hierarchies.

(3)

The information processing apparatus according to (2) described above, in which the processor registers the hierarchical user information in P2P network data.

(4)

The information processing apparatus according to (3) described above, in which the authority information is key information, and the processor encrypts the hierarchical user information using the key information or electronically signs the hierarchical user information using the key information, and registers it in the P2P network data.

(5)

The information processing apparatus according to (4) described above, in which the processor generates the key information using a public key cryptosystem or a common key cryptosystem.

(6)

The information processing apparatus according to (5) described above, in which a plurality of pieces of the key information is a plurality of public keys generated from one private key.

(7)

The information processing apparatus according to any one of (1) to (6) described above, in which the processor manages the authority information in association with an account of a social network service of a user.

(8)

The information processing apparatus according to (7) described above, in which the processor transmits, in response to a browsing request from another device via the social network service, the authority information for obtaining the user information to the other device.

(9)

The information processing apparatus according to (8) described above, in which the processor generates information associated with a browsing condition for browsing the user information, and transmits the information associated with a browsing condition together with the authority information.

(10)

The information processing apparatus according to (9) described above, in which the browsing condition includes any one of a browsing period, a browsing count, and a transfer count.

(11)

The information processing apparatus according to any one of (8) to (10) described above, in which information associated with virtual currency that is a consideration for obtaining the user information is received from the other device that requests the browsing request.

(12)

The information processing apparatus according to any one of (7) to (11) described above, in which different types of the user information are managed depending on a type of the social network service.

(13)

The information processing apparatus according to any one of (1) to (12) described above, in which the user information includes information associated with education received by a user.

(14)

The information processing apparatus according to any one of (1) to (12) described above, in which the user information includes information associated with an organization to which a user belongs.

(15)

A method for processing information that causes a computer to perform generating a plurality of pieces of authority information for obtaining user information classified into a plurality of categories, and generating the authority information to correspond to each of a plurality of the categories.

REFERENCE SIGNS LIST

100 Information management apparatus
102 Processor
104 Communication unit
106 Storage
108 Registration unit
110 Key generator
112 Condition information generator
200 Network
300 Information browsing apparatus
302 Processor
304 Communication unit
306 Storage

The invention claimed is:

1. An information processing apparatus, comprising:
processing circuitry configured to:
generate a plurality of pieces of key information for obtaining user information classified into a plurality of categories, wherein the key information corresponds to each of the plurality of categories and wherein the plurality of pieces of the key information is a plurality of public keys generated from one private key;
manage the user information in association with an account of a social network service of a user;
hierarchically classify the user information into a plurality of hierarchies and register the hierarchical user information in a P2P network;
generate a browsing condition for browsing the user information; and
transmit the browsing condition and the key information to another device in response to a browsing request from the other device via the social network service, wherein the browsing condition transmitted in response to the browsing request from the other device includes transfer information indicating whether or not the user information can be transferred by the other device to a third party and wherein the other device transfers or does not transfer the user information to the third party in accordance with the transmitted browsing condition.

2. The information processing apparatus according to claim 1, wherein
the processing circuitry is configured to encrypt the hierarchical user information using the key information or electronically sign the hierarchical user information using the key information, and register the hierarchical user information in the P2P network.

3. The information processing apparatus according to claim 2, wherein
the processing circuitry is configured to generate the key information using a public key cryptosystem or a common key cryptosystem.

4. The information processing apparatus according to claim 1, wherein
the browsing condition includes any one of a browsing period, a browsing count, and a transfer count.

5. The information processing apparatus according to claim 1, wherein
information associated with virtual currency that is a consideration for obtaining the user information is received from the other device that requests the browsing request.

6. The information processing apparatus according to claim 1, wherein
a different type of the user information is managed depending on a type of the social network service.

7. The information processing apparatus according to claim 1, wherein
the user information includes information associated with education received by a user.

8. The information processing apparatus according to claim 1, wherein
the user information includes information associated with an organization to which a user belongs.

9. A method for processing information that causes a computer to perform:

generating a plurality of pieces of key information for obtaining user information classified into a plurality of categories, wherein the key information corresponds to each of the plurality of categories and wherein the plurality of pieces of the key information is a plurality of public keys generated from one private key;

managing the user information in association with an account of a social network service of a user;

hierarchically classifying the user information into a plurality of hierarchies and registering the hierarchical user information in a P2P network;

generating a browsing condition for browsing the user information; and transmitting the browsing condition and the key information to another device in response to a browsing request from the other device via the social network service, wherein the browsing condition transmitted in response to the browsing request from the other device includes transfer information indicating whether or not the user information can be transferred by the other device to a third party and wherein the other device transfers or does not transfer the user information to the third party in accordance with the transmitted browsing condition.

* * * * *